H. E. SCHIMMEL.

GROUNDING DEVICE.

APPLICATION FILED AUG. 23, 1916.

Reissued Oct. 24, 1916. 14,207.

Inventor
Henry E. Schimmel
By Horatio E. Bellows
Attorney

UNITED STATES PATENT OFFICE.

HENRY E. SCHIMMEL, OF PROVIDENCE, RHODE ISLAND.

GROUNDING DEVICE.

14,207. Specification of Reissued Letters Patent. Reissued Oct. 24, 1916.

Original No. 1,088,101, dated February 24, 1914, Serial No. 663,264, filed December 1, 1911. Application for reissue filed August 23, 1916. Serial No. 116,558.

*To all whom it may concern:*

Be it known that I, HENRY E. SCHIMMEL, a citizen of the United States, residing at Providence, in the county of Providence and State of Rhode Island, have invented certain new and useful Improvements in Grounding Devices, of which the following is a specification.

My invention relates to grounding devices and more particularly to the means for connecting an insulating head to an electrical conduit.

The object of my invention is to afford a practical and approvable means for grounding a wire as a substitute for the employment of a bushing heretofore required to be soldered to the end of a conduit, which bushing has proved very unsatisfactory in operation and effect as well as involving much labor in applying.

The further object of my invention is to render the coupling member readily applicable to use in conjunction with an approved form of insulating head portion; and further to provide a structure which is simple to operate, effective in use, and inexpensive to manufacture.

To all the above enumerated ends essentially my invention consists in such parts and in such combinations of parts as fall within the scope of the appended claim.

Figure 1:
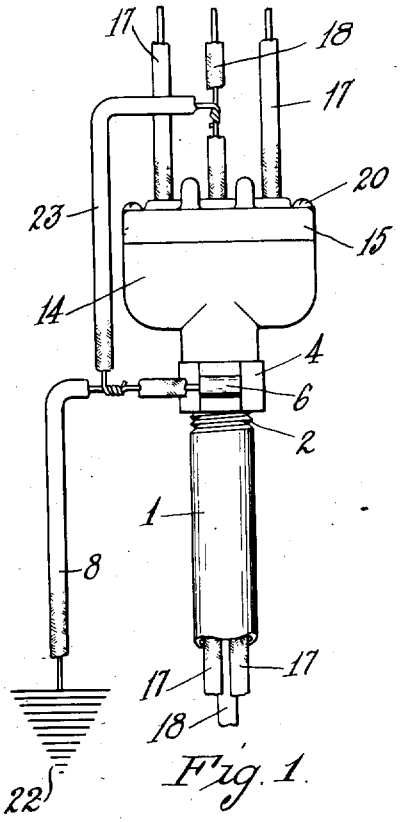
Figure 2:
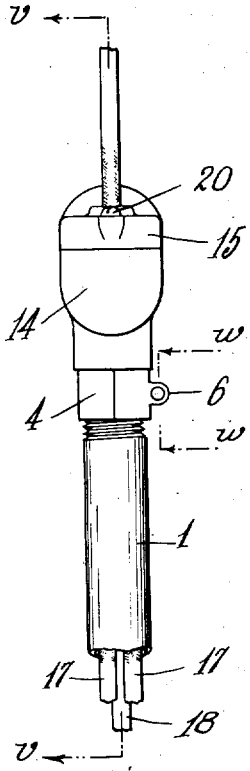
Figure 3:
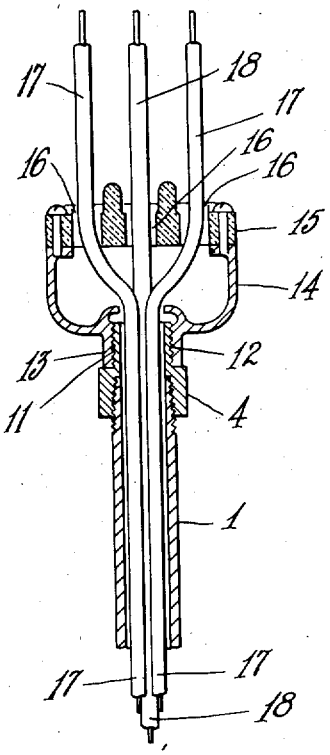
Figure 4:
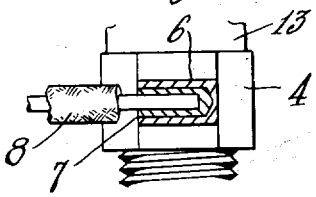
Figure 5:
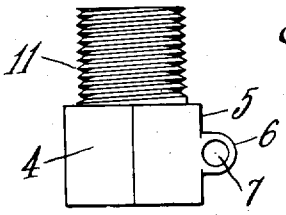
Figure 6:
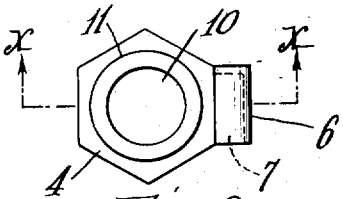
Figure 7:
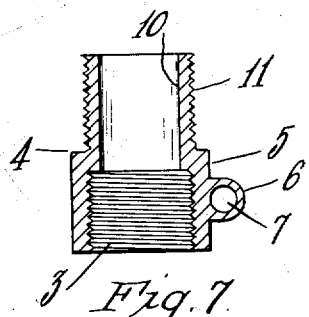

In the accompanying drawings which form a part of this specification, Figure 1 is a front elevation of my grounding device, Fig. 2, a side elevation of same, Fig. 3, a section on line *v v* of Fig. 2, Fig. 4, a section on line *w w* of Fig. 2, Fig. 5, a side elevation of the coupling member, Fig. 6, a plan view of the same, and Fig. 7, a section on line *x x* of Fig. 6.

Like reference characters indicate like parts throughout the views.

In the accompanying drawings, 1 represents a pipe or conduit provided at one end with the usual threads 2, which engage the interior threads 3 of an extension coupling 4, upon whose body portion 5 and integral therewith is an integral transversely disposed semi-circular lug 6 provided with a longitudinal opening 7. The portions 6 and 7 are adapted to form a seat or socket for a grounding wire 8. The body 5 of the coupling has a polygonal exterior, and extending from the body portion in alinement therewith is a tubular portion 10, provided with external threads 11. These threads are adapted to engage internal threads 12 upon the neck 13 of the enlarged body portion 14 of an insulating head, which head is completed by the insulating plate 15. The plate 15 is provided with a plurality, in this instance, of three openings 16 to permit egress therethrough of the two insulated current wires 17 and the neutral wire 18, which also pass through the conduit 1. The insulating plate or insulating portion of the head is fixed to the body portion of the latter by screws 20.

The grounding wire 8 is herein shown as grounded at 22 which may be a gas pipe or water pipe. Connecting the wire 8 and the neutral wire 18 is a connecting wire 23.

What I claim is,—

A head and conduit adapted to carry current wires and a neutral wire, a coupling adapted to connect said head and conduit, said head carrying an insulating plate with a plurality of independent openings for the neutral and current wires, a transversely disposed lug integral with the exterior of said coupling and provided with a longitudinal opening adapted to receive a grounding wire, a grounding wire entering the opening in said lug, current wires traversing the head, the conduit and the coupling and said plate, a neutral wire traversing the head, the conduit and the coupling and said plate and a wire connecting said grounding wire and the neutral wire.

In testimony whereof I have affixed my signature.

HENRY E. SCHIMMEL.